United States Patent Office 3,498,794
Patented Mar. 3, 1970

3,498,794
PROCESS FOR THE PREPARATION OF HYDRATABLE PROTEIN FOOD PRODUCTS
Francis E. Calvert, St. Louis, Mo., and William T. Atkinson, Minneapolis, Minn., assignors to Archer-Daniels-Midland Company, Minneapolis, Minn, a corporation of Delaware
No Drawing. Filed Jan. 25, 1965, Ser. No. 427,938
Int. Cl. A23j 1/14
U.S. Cl. 99—17         10 Claims

ABSTRACT OF THE DISCLOSURE

A hydratable protein food product is obtained by mixing a vegetable protein, having a protein concentration of at least 70% with releasable water not to exceed a total water content of 50%, based on total composition, and 0.1 to 10%, based on total composition, of a water-soluble salt selected from the class consisting of cysteine salts, hypophosphite salts, sulfite salts and sulfide salts, the pH of the mixture being adjusted to be within the range of 5.0 to 8.0, subjecting the resulting mixture to a plastic flow at temperatures of 120 to 210° F. and a pressure of at least 1000 p.s.i., and thereafter drying the resulting product.

---

This invention relates to the preparation of hydratable protein food products and, more particularly, to the preparation of hydratable protein food products employing vegetable proteins.

Although the high nutritional value of proteins obtained from materials such as oil seeds has long been recognized, their use as a source of protein in the human diet has not been widely accepted in view of the physical characteristics of the products derived from these protein sources. Thus, in general, the proteins isolated from oil seed are in the form of a powder, and can only be served directly in the form of a mush, which, although suitable for human consumption, is not attractive from a standpoint of texture and physical appearance.

Much effort has been directed to improving the form and texture of edible proteins isolated from oil seeds. These methods have employed techniques developed in the textile and plastics industry for the fabrication of high polymeric materials. However, most of the methods developed still suffer from the inability of the resulting products to be employed in the cooking recipes developed for natural proteinaceous products. Using special additives and complicated and expensive processing techniques, it has been possible to impart some degree of shape and texture retention on contact with water at cooking temperatures. However, no simple and economical method has heretofore been available to produce shaped forms from isolated oil seed proteins, which can be employed in food recipes without disintegration and which remain firm, pleasantly textured and chewable.

It is therefore an object of the present invention to provide a method of converting proteins isolated from oil seeds into shaped pieces which will resist disintegration on contact with hot water. It is another object of the present invention to produce a dry, dense, mechanically strong protein structure which can be hydrated without disintegration into a firm, flexible, tender, spongy structure which retains the general outline and shape of the original dehydrated structure. Other objects will become apparent hereinafter.

The objects of the present invention are accomplished by a process which comprises mixing a vegetable protein, having a protein concentration of at least 70 percent, with releasable water such that the total water concentration does not exceed 50 percent, based on total composition, and generally is within a range of 20 to 50 percent, based on total composition, and with 0.1 to 10 percent, based on total composition, of a soluble salt of a weak acid having a dissociation constant below $1 \times 10^{-5}$, the pH of said mixture being adjusted to be within the range of 5.0 to 8.0, and thereafter subjecting the resulting mixture to plastic flow at a temperature of 120 to 210° F. and a pressure of at least 1000 p.s.i. and recovering a coherent, translucent, homogeneous protein product which can be hydrated without disintegration.

It is believed that subjecting dry powdered protein concentrates to high pressure and controlled amounts of moisture and heat, in the presence of a plastic flow-inducing agent, ruptures many naturally occurring intermolecular bonds between the protein chains. In so doing, the attraction between the protein molecular chains lessens, and under the high pressure applied, certain natural geometrical protein structures collapse. This permits the molecular chains to slip and slide into and around each other thereby forming the translucent, homogeneous, coherent protein product of the present invention. As a result of the conditions employed in the process of the present invention, it has been concluded that the protein molecules are physically rearranged into a more closely packed structure in which the molecules are aligned and oriented as a result of the conditions employed. It is believed that this packing and orientation causes the translucent appearance of the protein product prepared by the process of the present invention and imparts its ability to retain shape and texture on hydration even after prolonged contact with water at cooking temperatures.

The term "plastic flow," as employed in the description of the present invention, can therefore be defined as the application of pressure to the particulate protein starting material to cause the molecules to flow together into a coherent, translucent, plastic mass.

The presence of controlled quantities of moisture in the protein during the hot plastic flow phase is also an essential factor of the process of the present invention. The moisture serves not only to induce swelling and reduce protein interchain attraction and hydrogen bonding, and thereby to assist plastic flow at the elevated temperatures and pressures of the process, but it further produces innumerable criss-crossing microvoids or pathways in the protein product. It is believed that these microvoids allow the water to penetrate the protein product and thus permit its ready hydration and swelling without loss of structure and shape. Thus, although the protein product produced by the process of the present invention appears to be a dense, homogeneous, translucent solid having high mechanical strength, it can be rapidly and uniformly expanded in hot or boiling water to a structure several times the size of the dehydrated product without disintegration.

The hydratable protein food product of the present invention can be prepared from any vegetable protein concentrate, although it is in general preferred to employ protein derived from oil seed meals such as are obtained upon solvent extraction of the oily and fatty constituents of oil seeds. The concentrate is prepared from the oil seed meal by isoelectric point precipitation of protein solubilized from the meal. The various methods employed to produce such protein concentrates have been described and are well known to those skilled in the art and therefore need not be further described. In order to achieve plastic flow and cause the formation of the hydratable structure through molecular rearrangement, it is, however, necessary to employ a concentrate which contains protein in a concentration of at least 70 percent. At lower concentration, the inert constituents of proteinaceous products interfere in the necessary molecular rearrangement. The preferred protein concentrates employed in the process of the present invention are those derived from soy meals although protein concentrates obtained from peanut, cotton seed or sesame seed meal may similarly be employed.

The protein concentrates are preferably used in the form of air dry powders containing varying amounts of moisture. The particle size of the powder is not critical although the powder should be fine enough to allow thorough mixing of the powder with the water and the other additives before it is subjected to plastic flow and yet not so fine that excessive amounts of dust will be caused during blending in conventional mixing equipment. In general the proteins are ground fine enough to 100 percent pass a 35 to 100 mesh screen.

The quantity of water which will give rise to maximum plastic flow and thus to the greatest shape and texture retention on hydration will vary with the nature of the protein concentrate, the method by which the protein concentrate was prepared, the nature and concentration of the flow inducing agent employed and the temperature at which the mixed protein composition is subjected to plastic flow. It will be realized by those skilled in the art that there is a certain concentration of chemically bound water in the protein which is not available to cause, in combination with the plastic flow-inducing agent, the necessary plastic flow. This concentration of chemically bound water will vary with the nature and process history of the protein concentrate as well as with temperature. It can be determined by careful drying procedures known to those skilled in the art for each protein concentrate employed in the process of the present invention.

Water present in the mixture above and beyond this concentration of chemically bound water can be referred to as releasable water which is available to participate in the plastic flow mechanism employed in the process of the present invention. The releasable water concentration of the mixture subjected to plastic flow, hereinafter also referred to as the protein mix, is at least 5 to 10 percent. Although the water concentration can be increased substantially above this minimum level, it is in general prefered to work close to these levels since maximum packing and orientation occurs at these levels. The resulting products have the highest degree of shape and texture retention on hydration.

If the water concentration is increased too much, such that the total water concentration of the protein mix exceeds 50 percent, the protein molecules are wedged too far apart so that insufficient packing and orientation occurs during the plastic flow step of the present invention. The resulting product when dried undergoes excessive shrinkage and distortion during drying and the dried product is less translucent and easily fractured. The hydrated product, prepared from protein structures obtained by subjecting a protein mix containing too much water to plastic flow, swells to a soft protein mush that has lost practically all of its original structural form; in fact it approaches the characteristics of a colloidally dispersed, transparent mushy protein paste. The necessary plastic flow can be achieved with most protein materials when the total water concentration, based on the protein mix, is maintained between 20 and 50 percent, the preferred range being 25 to 45 percent.

Most protein concentrates are isolated at a pH in the range of 4 to 5. At these levels the protein concentrates are too sour for human consumption nor can such protein concentrates readily be subjected to plastic flow in standard equipment in view of the high pressures required. The pH is generally adjusted to a value between 5.0 and 8.0 and preferably to a value between 6.5 to 7.5 by the addition of an alkaline reagent such as preferably sodium hydroxide. Certain protein concentrates may be in the form of sodium proteinate which has too high a pH value. The pH of such materials is readily adjusted by the addition of an acid such as hydrochloric or acetic acid. If the pH is too high, the material is too bitter.

The process of the present invention is carried out in the presence of a plastic flow inducing agent comprising the soluble salt of a weak acid having a dissociation constant below $1\times10^{-5}$; i.e., $1\times10^{-6}$, $1\times10^{-7}$, etc. The function of this salt is not clearly understood except that it was found to be helpful to cause the plastic flow which results in the hydratable characteristics of the protein food product of the present invention. The term soluble is meant to define solubility of the salt in water at the reaction temperatures in the concentrations in which it is employed. It was found, in general, that weak acid salts which have a water solubility of at least one to two percent at room temperature meet this requirement. In view of the solubility requirement, alkali metal or ammonium salts are preferably employed.

It will be apparent that a wide variety of acids can be employed in the form of soluble salts as plastic flow inducing agents in the process of the present invention. From the standpoint of operability, the soluble salt of any weak acid that has the required dissociation constant can be employed and, hence, the choice of the particular salt employed is dictated by other factors such as toxicity, taste, price, and nutritional value. The ammonium and alkali metal hypophosphites are outstanding plastic flow inducing agents and are exceptionally advantageous for edible products because they impart no flavor and are nontoxic in the concentrations employed in the process of the present invention. Another group of highly effective plastic flow inducing agents, which have nutritional value, are the alkali metal or ammonium cysteine salts. Sulfites and sulfides of ammonia or the alkali metals are good flow inducing agents but have the disadvantage of imparting undesirable flavor. Although as much as 10%, based on the protein mix, of the plastic flow inducing agent can be employed, it is in general not necessary to use more than one percent and, hence, the preferred concentration of the plastic flow inducing agent is from 0.25 to 1 percent, based on the protein mix. Mixtures of plastic flow inducing agents may also be employed.

The process is carried out at reaction temperatures of 120° to 210° F. Elevated temperatures are preferred since plastic flow occurs more readily at these temperatures.

Many mechanical devices or machines are suitable for the plastic flow step of the present invention. It is only necessary that they should be of sufficient ruggedness, power and proper design to apply pressures in the range of 1000 to 10,000 p.s.i. and that they are capable of being heated to give rise to the necessary temperatures in the protein mix. Examples of suitable equipment are roll mills having differential or even speed and equipped for heating and cooling, heatable revolving screw and hydraulic ram presses, injection molding machines, thermoplastic extrusion and compression molding machines and many other machines which compress a plastic mass at the desired temperatures under sufficient pressure. It will be apparent that the precise type of equipment employed is not a critical feature of the process of this invention.

The mechanically strong, translucent protein product is obtained in the form of sheets, bars, rods or other shapes depending on the type of equipment employed. The relatively massive shapes may be cut into smaller chunks or pieces and then air dried to remove excessive moisture from the product. Revolving or reciprocating blade cutters may be employed for this purpose.

The cut, dried protein food product obtained by the process of the present invention is readily packaged, handled and stored. The dried product can be stored indefinitely and does not require refrigeration. The cut pieces can be swollen, by contact with hot water, into edible, flexible, tender, nutritious structures many times their original volume without disintegration. These pieces, furthermore, retain their original shape and structure on prolonged heating in water. Following hydration the water filled protein structure should be handled similarly to other perishables, since it is highly digestible and subject to bacteria or mold attack.

The invention is further illustrated by the following example.

EXAMPLE

Into a rotating change-can mixer is placed 6000 g. of a soybean protein obtained by isoelectric point precipitation of protein solubilized from defatted soybean meal. To the protein is added 60 g. of sodium hypophosphite dissolved in 2240 ml. of water in fine streams under agitation. The temperature of the mixer is maintained below 120° F. to prevent prereaction. After sufficient mixing to obtain a uniform distribution of the water, there is then added slowly 140 g. of sodium hydroxide in the form of a 50% aqueous solution to result in a pH of 6.7. The mixing is continued until the protein mix appears to be uniform. A total mixing time of 20 to 60 minutes is usually sufficient to obtain the desired degree of uniformity in the protein mix; which, at this point, has no transparency whatsoever, and appears to be a moist particulate mass.

The protein mix is then fed into the nip of a roll mill in which the rolls operate at a differential speed. The slow roll is maintained at a temperature of 180° F. and the fast roll at a temperature of 200° F. The distance between the rolls is set at ⅛ inch. The feeding of the protein mix is adjusted to permit a milling time of about one minute although longer or shorter milling times can be employed. On forming the translucent appearance caused by plastic flow, the product is taken off the roll mill in the form of a moist sheet. The sheet is cut into pieces and dried in an air oven. The resulting pieces swell when placed into water at 120° F. and pick up 3 to 5 times their weight of water without disintegration.

It is evident that numerous modifications will appear to those skilled in the art upon reading the foregoing disclosure. All such modifications are intended to be included in the scope of the invention as defined in the following claims.

What is claimed is:

1. A process for preparing hydratable protein food products which comprises mixing with a vegetable protein, said protein being a concentrate having at least 70% protein, releasable water not to exceed a total water content of 20 to 50% based on the total composition, with 0.1 to 10% of a water-soluble salt selected from the class consisting of systeine salts, hypophosphite salts, sulfite salts and sulfide salts, the pH of the mixture being adjusted to be within the range of 5.0 to 8.0 subjecting the resulting mixture to plastic flow at a temperature of 120° to 210° F. and a pressure of at least 1,000 p.s.i., and thereafter drying the resulting product.

2. The process of claim 1 wherein the salt is a hypophosphite.

3. The process of claim 1 wherein the salt is a cysteine salt.

4. The process of claim 1 wherein the protein is an oil seed protein.

5. The process of claim 1 wherein the protein is a soy bean protein.

6. A process for preparing hydratable food products which comprises mixing with a soy bean protein, having a protein concentration of at least 70%, water, to a total water content of 20 to 50%, based on total composition, and 0.1 to 10% of a water-soluble hypophosphite salt, the pH of the mixture being adjusted to be within the range of 5.0 to 8.0, subjecting the resulting mixture to plastic flow at a temperature of 120 to 210° F. and a pressure of at least 1000 p.s.i., and thereafter drying the resulting product.

7. The process of claim 6 wherein the hypophosphite salt is an alkali metal hypophosphite.

8. The process of claim 6 wherein the pH is maintained between 6.5 and 7.5.

9. The process of claim 6 wherein the soy bean protein is obtained by isoelectric point precipitation of protein obtained from defated soy bean meal.

10. The process of claim 6 wherein the soluble salt concentration is from 0.1 to 1.0%.

References Cited

UNITED STATES PATENTS 3,268,336   8/1966   Hale et al. _____ 99—80

OTHER REFERENCES

Altschul et al., Processed Plant Protein Foodstuffs, New York Academic Press, Inc., 1958, pp. 403–404.

Wilson, C. L., et al., Comprehensive Analytical Chemistry, New York Elsevier Publishing Co., 1960, vol. Ib, pp. 152–153.

MAURICE W. GREENSTEIN, Primary Examiner

U.S. Cl X.R.

99—14